Nov. 6, 1956 T. R. N. DAVIDSON ET AL 2,769,520

ARTICLE TRANSFER APPARATUS

Filed May 22, 1953 2 Sheets-Sheet 1

Inventors:
Thomas R. N. Davidson,
Arthur H. Scruton,
by Vernet C. Kauffman
Their Attorney

ARTICLE TRANSFER APPARATUS

Filed May 22, 1953 2 Sheets-Sheet 2

Inventors:
Thomas R. N. Davidson,
Arthur H. Scruton,
by Vernet C. Kauffman
Their Attorney United States Patent Office 2,769,520

Patented Nov. 6, 1956

2,769,520

ARTICLE TRANSFER APPARATUS

Thomas R. N. Davidson and Arthur H. Scruton, Wembley, England, assignors to General Electric Company, a corporation of New York Application May 22, 1953, Serial No. 356,794

Claims priority, application Great Britain June 5, 1952

3 Claims. (Cl. 198—26)

This invention relates to mechanical transfer arrangements linking one machine to another for the transfer of articles. Such arrangements may be used, for example, in the manufacture of the articles by mass production methods, wherein each machine is arranged to carry out a particular operation on the articles. In certain cases it is not possible accurately to synchronize the machines between which the transfer is made, and delivery of an article to a machine at the wrong time, that is when the mchine is not in the correct position to receive the articles, may result in damage to, or destruction of, the article or even, in some cases, in damage to the machine itself.

This invention is particularly, though not exclusively, concerned with arrangements for transferring cylindrical articles, such as, for example, glass rods or tubes, and the object of the invention is to provide such transfer arrangements incorporating delaying means for preventing delivery of articles to the second machine when it is not in the correct position for receiving them.

According to the invention a mechanical transfer arrangement for transferring articles from a first machine to a second machine includes a delivery channel along which the articles are arranged to pass automatically for delivery from the first to the second machine, stopping means arranged in the operative position to stop the passage of said articles along the delivery channel at a predetermined point in the channel, and locking means for the stopping means. The stopping means is arranged to be automatically withdrawn intermittently from the stopping position in synchronism with the first machine so as to release said articles to the second machine normally at predetermined time intervals. The locking means for the stopping means is arranged to be automatically operated intermittently and in synchronism with the second machine so as to occupy, during those periods in which an article released by the stopping means would arrive at the second machine at the wrong time, a position which locks the stopping means in the operative position against any attempted withdrawal.

In some cases the delivery channel may be inclined to the horizontal and the articles arranged to be fed from the first machine to the second machine along the channel under gravity.

The construction of the channel will depend on the nature of the articles which are to be transferred and may, for example, in the case of articles in the form of rods or tubes, comprise two parallel ramps each inclined slightly to the horizontal and set a distance apart which is slightly less than the lengths of the rods or tubes, so that the rods or tubes can roll down the ramps.

The stopping means may include one or more stops arranged to project upwards from below the channel into the path of an article travelling along the channel, means being provided for lowering the stops intermittently from the said path in synchronism with said first machine. The locking means may then comprise one or more members arranged to pass beneath part of the stopping means in synchronism with the movement of the second machine, so as to engage with the said part of the stopping means and prevent the lowering of the stops in the event of the second machine not being in the correct position for receiving the article which would be delivered from the first machine by the lowering of the stops.

The stopping and locking means may each be actuated by a piston operated by air pressure controlled by the first and second machines, respectively, by means of suitable air valves; the air valves may be controlled, for example, by cams forming part of or driven by the machines.

It will be obvious that the relative rates of operation of the two machines must be such that the second machine is ready to receive articles at a rate which is equal to or greater than the maximum rate of delivery of the articles from the first machine. In other words, the second machine or its conveyor will have spaced article-accepting time intervals recurring at a higher rate, that is, more closely spaced in time, than the rate at which the articles are delivered by the first machine or its conveyor. Alternating with the article-accepting time intervals will be nonaccepting time intervals during which an article must not be delivered to the second machine or its conveyor.

One particular embodiment of the invention for controlling the transfer of elongated cylindrical articles, such as glass tubes used as the envelopes of tubular electric discharge lamps, from a machine arranged to sever the tubes from a continuous length of tube (fed to it by a tube drawing machine) to a machine for processing the lengths of tubing will now be described by way of example with reference to Figs. 1 to 4 of the accompanying schematic drawings, in which:

Fig. 3 shows schematically the method of linking the two machines, and

Figures 1, 2:
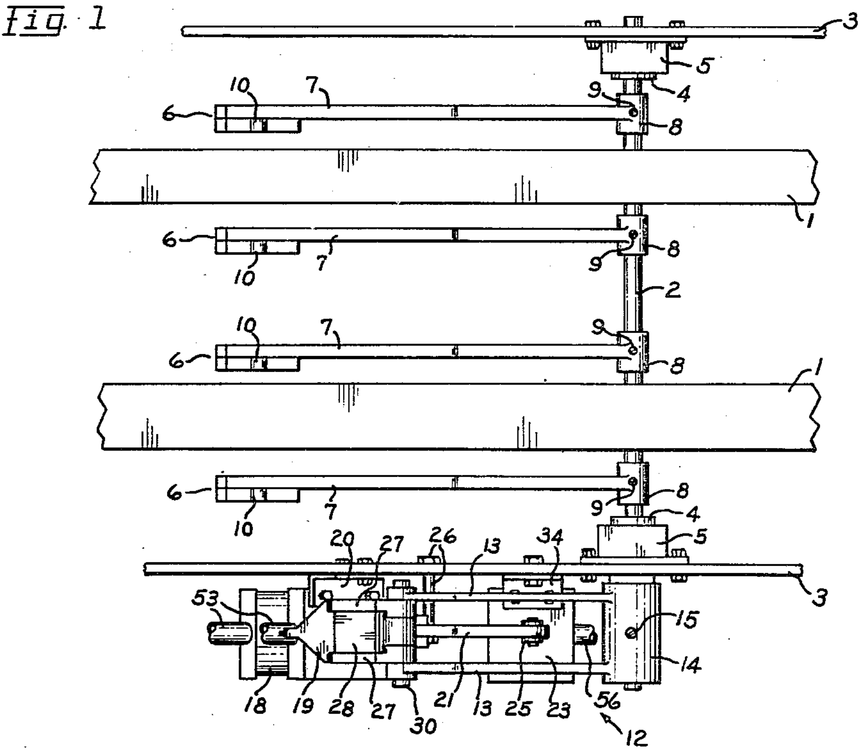
Fig. 1 illustrates a plan view of part of the arrangement.
Fig. 2 shows a side elevation of the part of the arrangement shown in Fig. 1.

Referring more particularly to Figs. 1 and 2 of the drawings, in this embodiment two parallel ramps 1 which constitute the said channel and are inclined slightly to the horizontal, are provided for allowing the tubes to roll from one machine to the other, the machines not being shown. Underneath the ramps extends horizontally, and transversely to the ramps, a rod 2 of square cross section supported at each end from a supporting member 3. The ends of the rod itself are arranged to fit coaxially into two bearing cylinders 4, each having an axial hole of square cross section provided for that purpose, and the bearing cylinders are each located within a cylindrical hole in a bearing housing 5, bolted to one of the supporting members 3. The bearing cylinders are free to rotate within the bearing housings and the rod 2 is thus able to rotate relatively to the supporting members.

Extending perpendicularly from the rod and parallel to each other are arranged four tube stopping arms 6, two of which lie between the ramps 1, and another arm lying between each ramp and the adjacent supporting member 3. Each arm consists of a flat metal bar 7 welded at one end to a cylindrical metal block 8 so that it projects radially from the block midway between the two ends, with the broad surfaces of the bar parallel to the end surfaces of the cylinder. A hole having a square cross-section extends axially through each block and within these holes is arranged to fit the rod 2; screws 9, which pass through tapped holes in the walls of the cylinders for abutment against the rod, are provided for keeping the cylinders in position on the rod. The end parts of the arms remote from the cylinders are each bent upwards through a small angle relatively to the rest of the arm, and to each end is attached a tube stop 10 formed of bakelised linen sheet. These stops have a substantially triangular top portion, arranged with an apex projecting in an upward direction when the stops are attached to the arms, and substantially rectangular base portion provided with holes through which screws 11 are screwed into tapped holes in the arms for attaching the tube stops to the arms.

The rod 2 is arranged, in operation, to oscillate intermittently about its axle, at a rate depending on the rate of working of the machine delivering the tubes to the ramps, through an angle such that the triangular portions of the tube stops can be alternately raised above the level of the surface of the ramps to form a barrier to the passage of a tube rolling down the ramps, and withdrawn below the said surface so that the barrier is removed.

For actuating the rod there is attached to one end an actuating member 12 consisting of two parallel metal arms 13 welded at one end ot a cylindrical metal body 14 so that they project radially from it, the body being provided with an axial hole of square cross section, within which hole is arranged to fit the rod 2. The cylindrical body is kept in position on the rod by means of a screw 15 which extends radially through a tapped hole in the wall of the body and abuts against the rod, the arms 13 of the actuating member being arranged to extend parallel to the tube stopping arms 6 but being shorter than those arms.

Connected to the free ends of the arms 13 of the actuating member 12 is a link 16 formed of two parallel plates 27 joined by a transverse plate 28, one end of the parallel plates being arranged to fit within the free ends of the arms 13 and to be connected thereto by means of a cylindrical pin 30 which passes through aligned holes in the arms 13 and the plates 27. The link is arranged to be connected at the other end to the piston rod 31 of an air operated piston 17, by means of a pin 29 which passes through aligned holes in the link plates and through a hole in the end of the piston rod, the rod lying between the two plates. The cylinder 18, within which the piston 17 is arranged to operate, is situated below the link 16, and is attached to the adjacent supporting member by means of two angle plates 20 bolted to the top and bottom of the cylinder, respectively, and to the supporting member, the axis of the cylinder being inclined slightly from the vertical.

The air pressure necessary to operate the piston is fed by pipes 53 from an air valve 52 (Fig. 3) controlled by means of a cam 51 (Fig. 3) driven by the machine delivering the tubes to the ramps, thereby actuating the tube stops 10 in synchronism with this machine.

The locking mechanism comprises a latch member 19 situated between the link plates 16, and arranged to pivot about the pin 30, and a cooperating bell crank lever 21, the latch member being biased towards the lever 21 by means of a helical biasing spring 24 attached at one end to the latch member and at the other end to a pin 36 extending between the two link plates 27. The latch member is raised and lowered with the stopping means under the action of the piston 17 and a projecting latch 32 on the member is arranged to engage with a suitably shaped projection 33 on the lever, in certain positions of the latch and the lever. The lever itself is supported by means of a horizontal bolt 26 attached to the adjacent supporting member 3 and about which bolt the lever can pivot in a vertical plane. To the end of one arm, which is arranged to lie approximately horizontally, is attached a link 25, the other end of the link 25 being connected, by means of a piston rod 35, to a piston 22 free to slide within a cylinder 23, the cylinder being attached to the supporting member 3, with its axis vertical, by means of angle plates 34 bolted to the two ends of the cylinder. The piston 22 is operated by air pressure fed to the cylinder by means of pipes 56 from an air valve 55 (Fig. 3) which is controlled by a cam 54 (Fig. 3) driven by the machine to which the tubes are delivered. The operation of the piston 22 thereby actuates the bell crank lever 21 in synchronism with the said machine and causes the arm of the lever remote from the piston 22, which arm extends in an upward direction from the pivot, to be alternately placed in and out of the locking position, in which position it extends beneath the latch 32 and prevents withdrawal of the stopping means.

In Fig. 2 both the pistons 17, 22 are shown at the top of the respective cylinders, the bell crank lever 21 being then in the locking position, and the tube stops 10 forming a barrier to the passage of tubes rolling down the ramps 1.

The tube stops cannot then be lowered until the bell crank actuating piston 22 is forced to the bottom of the cylinder 23, so removing the operative end of the lever 33 from beneath the latch 32.

The arrangement of the timing control for the stopping and locking means is shown schematically in Fig. 3. The first machine and the second machine each include a conveyor 46 and 47, respectively (only parts of which are shown) for delivering the tubes to and receiving the tubes from the ramps 1. Each conveyor comprises two parallel endless chains 48, driven by rotating sprockets 49 in the direction indicated by the arrows, the chains being provided with outwardly projecting fingers 50 between which the tubes are arranged to rest whilst being carried by the conveyors.

The cam 51 which is driven by the first machine is arranged to operate the air valve 52 once in every revolution, the air valve being connected to the cylinder 18 by means of air pipe lines 53 for operating the tube stops 10. Similarly the cam 54 which is driven by the second machine is arranged to operate the air valve 55 once in every revolution, the valve being connected to the cylinder 23 by air pipe lines 56 for operating the bell crank lever 21. The cams are arranged to make one revolution in the time it takes two successive fingers of the respective conveyors to pass any fixed point, and are arranged to be adjustable relatively to their respective driving spindles 57, 58, for adjusting the timing of the stopping and locking means.

The time taken for a tube to roll from the tube stops 10 to the receiving machine is taken into consideration when adjusting the cam 54 driven by this machine so that the bell crank actuating piston and thereby the lever 21 is arranged to be in the locking position when a tube, if starting at rest from the tube stops would reach the receiving machine when the machine is not in the correct position to receive the tube.

In Fig. 3 the bell crank lever 21 is shown in the locking position, the dotted lines 59 indicating the positions the fingers 50 would reach in the time taken for a tube to roll from the stops 10 to the machine if released at the instant shown. This position of the conveyor is incorrect for receiving a tube since the tube would hit the end of the finger; moreover, a slight delay at one end of the tube in reaching the machine may result in one end of the tube being picked up by a finger on one conveyor chain and the delayed end of the tube may abut against the end of corresponding finger on the other chain and not be picked up by it, which would lead to breakage of the tube and possibly damage to other tubes.

Figure 4:
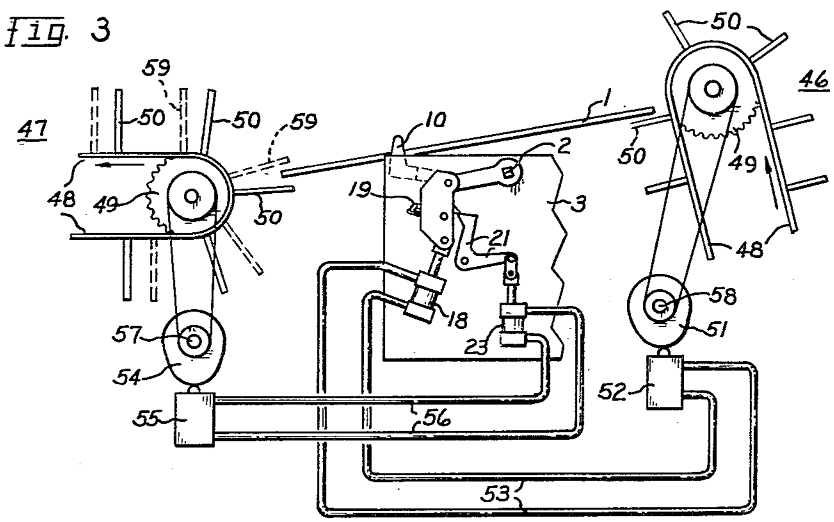
Fig. 4 illustrates a perspective view of part of the arrangement with sections cut away to show the locking mechanism in more detail.

The construction of the locking mechanism is shown in more detail in Fig. 4 which illustrates a perspective view of this part of the arrangement with part of the link and actuating member cut away. The latch member 19 comprises a substantially rectangular metal sheet 37 provided centrally on one of the shorter edges with a circularly shaped lug 38 normal to the plane of the sheet and to the said edge, and having a hole drilled coaxially through it parallel to the edge. The circular lug 38 is arranged to fit between the ends of the actuating arms 13 and the link plates 27, the pin 30 about which the latch is arranged to pivot, being arranged to extend through the hole in the lug, with the sheet 37 lying between and perpendicular to the link plates. At the other end of the sheet and projecting perpendicularly from it is the latch 32 which is arranged to cooperate with the projecting end 33 of the bell crank lever 21, the bottom surface of the latch being parallel to the lower edge and perpendicular to the surface of the sheet. The top surface 39 of the latch is inclined towards the bottom surface so that the latch has a substantially knife-edge shape.

Welded to and extending perpendicularly in the other direction from the same end of the sheet is another sheet 40 of the same width as the first sheet 37 but provided near the other end with two outwardly projecting lugs 41 integral with it and both lying in the same plane as the sheet. The width of the sheet diminishes symmetrically from the lugs towards its free end, this end being provided with an additional lug 42 extending in an axial direction from the sheet, and which is bent downwards at right angles to the sheet. A hole is provided through the lug 42 extending parallel to the axis of the sheet for attaching one end of the helical biasing spring 24 to the latch member, a loop 42 at the end of the spring passing through the hole. The pin 36 extending between the link plates 27 is arranged to fit within a similar loop 44 at the other end of the spring 24 for attaching the spring to the link.

The projecting end 33 of the bell crank lever 21 has a substantially horizontal top surface which is arranged to engage under the latch 32, and a lower surface inclined towards the upwardly directed arm of the lever, the inclined under surface being provided for enabling the latch 32 to ride over the end of the projection when travelling in an upward direction. The contact surfaces of the projecting end 33 of the lever are increased by brazing to each side of the projection a triangular metal piece 45 of the same shape as the projection.

It will be apparent that for acutating the stopping and locking means other methods apart from air operated pistons may be utilized, for example electrically operated solenoids or direct mechanical operation from the machines themselves where this is convenient. Similarly, if desired, the stopping and locking means may be situated above the sloping surfaces, the stops for the cylinders being arranged to be lowered to the operative position and the locking means being arranged to prevent the raising of the stops at the required times.

We we claim as new and desire to secure by Letters Patent of the United States is:

1. In combination, a first conveyor for receiving articles from a machine and a second conveyor for delivering the articles to another machine and having relative rates of operation such that the second conveyor is ready to receive articles at a rate which is greater than the maximum delivery rate of the articles from the first conveyor, and a transfer apparatus comprising a delivery channel for said articles interconnecting said conveyors, stopping means in said channel normally arresting the passage of said articles at a predetermined point, a first actuating means operable intermittently in direct synchronism with the first conveyor to normally positively withdraw said stopping means and release said articles at predetermined time intervals, locking means normally positioned to block withdrawal of said stopping means, and a second actuating means operable intermittently and independently of said first actuating means and in direct synchronism with the second conveyor to positively move said locking means to unblocking position and permit release of the articles at predetermined time intervals corresponding to the rate of operation of said second conveyor.

2. The combination set forth in claim 1 wherein each said actuating means comprises a separate cam means coupled in direct synchronism with one of said conveyors to effect independent actuation of said stopping means and said locking means.

3. The combination set forth in claim 1 wherein each said actuating means comprises a fluid piston connected respectively to the stopping means and to the locking means, individual cam means coupled in direct synchronism with each conveyor, valve means arranged adjacent each cam means to be actuated thereby, fluid conduits connecting the valve means associated with the first conveyor with the piston associated with said stopping means, and fluid conduits connecting the valve means associated with the second conveyor with the piston associated with said locking means.

References Cited in the file of this patent

UNITED STATES PATENTS 2,576,369 Sticelber -------------- Nov. 27, 1951